(12) United States Patent
Hertel et al.

(10) Patent No.: US 10,309,485 B2
(45) Date of Patent: Jun. 4, 2019

(54) TORSIONAL VIBRATION DAMPER COMPRISING A DAMPING SYSTEM, A DAMPING DEVICE AND A GROUND DEVICE

(71) Applicant: ZF Friedrichshafen AG, Friedrichshafen (DE)

(72) Inventors: Martin Hertel, Bergrheinfeld (DE); Michael Winterstein, Gochsheim (DE); Jörg Sudau, Niederwerrn (DE)

(73) Assignee: ZF Friedrichshaften AG, Friedrichshafen (DE)

( * ) Notice: Subject to any disclaimer, the term of this patent is extended or adjusted under 35 U.S.C. 154(b) by 338 days.

(21) Appl. No.: 15/302,437

(22) PCT Filed: Mar. 20, 2015

(86) PCT No.: PCT/EP2015/055904
§ 371 (c)(1),
(2) Date: Oct. 6, 2016

(87) PCT Pub. No.: WO2015/158496
PCT Pub. Date: Oct. 22, 2015

(65) Prior Publication Data
US 2017/0023096 A1  Jan. 26, 2017

Related U.S. Application Data

(63) Continuation of application No. PCT/EP2015/055904, filed on Mar. 20, 2015.

(30) Foreign Application Priority Data

Apr. 15, 2014  (DE) .................. 10 2014 207 258

(51) Int. Cl.
*F16F 15/14* (2006.01)
*F16H 45/02* (2006.01)
(Continued)

(52) U.S. Cl.
CPC .............. *F16F 15/145* (2013.01); *F16D 3/12* (2013.01); *F16H 45/02* (2013.01);
(Continued)

(58) Field of Classification Search
CPC ... F16H 45/02–2045/0294; F16F 15/14; F16F 15/145; F16F 15/20; F16F 15/12346; F16D 3/12
See application file for complete search history.

(56) References Cited

U.S. PATENT DOCUMENTS 4,601,676 A * 7/1986 Tojima .............. F16F 15/12326
                                                      192/205
6,280,330 B1    8/2001 Eckel
(Continued)

FOREIGN PATENT DOCUMENTS

DE    102010049930    5/2011
JP       2012077827    4/2012

*Primary Examiner* — Jacob S. Scott
*Assistant Examiner* — Lillian T Nguyen
(74) *Attorney, Agent, or Firm* — Cozen O'Connor

(57) ABSTRACT

A torsional vibration damper (70) with a damping device which has an input (67) and an output (72) which is operatively connected to a driven side (73). The output is connected to a mass damper system (1) and also to a mass arrangement (100). One of the two subassemblies—i.e., mass damper system (1) and mass arrangement (100)—which are connected to the output (72) of the damping device (70) engages at the respective other subassembly comprising mass damper system or mass arrangement which is in turn connected to the output by a connection arrangement (77).

15 Claims, 6 Drawing Sheets

(51) Int. Cl.
*F16D 3/12* (2006.01)
*F16F 15/123* (2006.01)

(52) U.S. Cl.
CPC .. *F16F 15/12346* (2013.01); *F16H 2045/021* (2013.01); *F16H 2045/0226* (2013.01); *F16H 2045/0231* (2013.01); *F16H 2045/0263* (2013.01); *F16H 2045/0284* (2013.01)

(56) References Cited

U.S. PATENT DOCUMENTS

| | | | |
|---|---|---|---|
| 7,743,900 B2 * | 6/2010 | Breier | F16F 15/12373 |
| | | | 192/212 |
| 8,640,449 B2 | 2/2014 | Huegel | |
| 8,708,116 B2 | 4/2014 | Miyahara | |
| 2011/0192692 A1 * | 8/2011 | Werner | F16F 15/12353 |
| | | | 192/3.29 |
| 2014/0090514 A1 | 4/2014 | Toegel | |
| 2014/0345997 A1 * | 11/2014 | Gerdeman | F16D 33/18 |
| | | | 192/3.28 |
| 2015/0005078 A1 | 1/2015 | Sekiguchi | |
| 2015/0217774 A1 * | 8/2015 | Weber | F16H 45/02 |
| | | | 701/53 |
| 2015/0247538 A1 * | 9/2015 | Cerreta | F16J 15/16 |
| | | | 192/3.33 |

\* cited by examiner

TORSIONAL VIBRATION DAMPER COMPRISING A DAMPING SYSTEM, A DAMPING DEVICE AND A GROUND DEVICE

PRIORITY CLAIM

This is a U.S. national stage of application No. PCT/EP2015/055904, filed on Mar. 20, 2015. Priority is claimed on the following application: Country: Germany, Application No.: 10 2014 207 258.1, the content of which is incorporated herein in its entirety by reference.

FIELD OF THE INVENTION

The present invention is directed to a torsional vibration damper with a damping device which has an input and an output which is operatively connected to a driven side, and the output is connected to a mass damper system and also to a mass arrangement.

BACKGROUND OF THE INVENTION

A torsional vibration damper of the type mentioned above can be seen from US20140090514 in FIG. 3. This torsional vibration damper is provided for a hydrodynamic coupling arrangement having a hydrodynamic circuit formed by an impeller, a turbine and a stator. The input of the torsional vibration damper is operatively connected to a drive such as an internal combustion engine via a clutch device serving to bypass the hydrodynamic circuit during predetermined operating states, while the output of the torsional vibration damper is operatively connected to a driven side which is implemented, for example, as a torsion damper hub. Accordingly, the output of the torsional vibration damper is connected not only to a torsion damper hub but also to a mass damper system and to the turbine, and the turbine acts as a mass arrangement associated with the output of the torsional vibration damper.

In torsional vibration dampers having a damping device whose output is connected to a mass damper system as well as to a mass arrangement, there is the advantage of minimal rotational irregularity even under full load at very low speeds, for example, at a speed of 1,000 revolutions per minute. In conflict with this advantage, however, is the fact that there is a significant rise in rotational irregularity at higher speeds, for example, within a speed range of 1,500 to 1,800 revolutions per minute. This rise in rotational irregularity is accompanied by sharply declining deflection angles at the output of the damping device even when torsional vibrations are present at the input of the damping device. This behavior of the damping device, the output of which stays at least approximately in a vibration node, is determined through effects from the transmission arrangement. It is particularly disadvantageous for the output of the damping device to persist in a vibration node because this would dispense with the vibration excitations which are vital for the functioning of damper masses of the mass damper system connected to the output of the damping device. This is especially true with respect to the above-mentioned significant increase in rotational irregularity.

It is an object of the invention to construct a torsional vibration damper with a damping device, whose output is connected to a mass damper system and also to a mass arrangement, such that an increase in rotational irregularity in a determined speed range is at least limited.

SUMMARY OF THE INVENTION

A torsional vibration damper of this type is constructed with a damping device which has an input and an output which is operatively connected to a driven side, and the output is connected to a mass damper system and also to a mass arrangement.

According to a first embodiment, one of the two subassemblies in this torsional vibration damper—i.e., mass damper system or mass arrangement—which are connected to the output of the damping device engages at the respective other subassembly comprising mass damper system or mass arrangement which is in turn connected to the output by a connection arrangement. By separating the two connection points, a compact mode of construction can be achieved in the region of the output particularly in axial direction. In so doing, the mass arrangement preferably engages at the damper mass carrier of the mass damper system by a holder via a connection such as a riveted joint, while this damper mass carrier has a connection to the output by the connection arrangement which can likewise be constructed as a riveted joint.

According to an alternative embodiment, the two subassemblies in this torsional vibration damper—i.e., mass damper system and mass arrangement—which are connected to the output of the damping device engage at the output under axial offset by a common connection arrangement. In this case, the connection arrangement has a plurality of axially multi-stepped rivets which extend not only through the torsion damper hub but at least also through the damper mass carrier. The alternative embodiment is preferable when a connection point is to be dispensed with.

In both of the embodiments mentioned above, the driven side is preferably formed as torsion damper hub having a radial support for the damper mass carrier of the mass damper system and possibly also for a holder of the mass arrangement.

As an alternative to a connection arrangement formed by riveting, a connection arrangement can also be selected in which the radial support at the torsion damper hub has a first toothing and the damper mass carrier has a second toothing in operative connection with the first toothing. In order to secure these two toothings axially, they are held in an axially predetermined position relative to one another by an interference fit.

Insofar as the damping device of the torsional vibration damper has a plurality of damping units, of which the respective damping unit on the drive side is in operative connection with the respective damping unit on the driven side via an intermediate transmission, a selection of a predetermined energy storage combination, a configuration of energy storages for a predetermined load, or a construction of energy storages with a predetermined coil progression can be carried out in at least one damping unit of the damping device. For the selection of a predetermined energy storage combination, it is conceivable, for example, that there is at least one energy storage package in which, in order to achieve a multi-step characteristic, the individual energy storages are either formed with different stiffness and arranged at an offset in circumferential direction or in which the individual energy storages are arranged coaxial to one another and have different length extensions in extension direction. To configure energy storages for a determined load, it can be provided that the energy storages of at least one damping unit are designed for reducing the stiffness at partial load. In this case, however, it is necessary to have ready at least one damping unit with energy storages configured for full load so as to prevent rotational angle stops from taking effect in all of the damping units after predetermined deformation of the energy storages, which would cause the mass damper system to be acted upon directly by excitations present at the input of the torsional vibration damper. Finally, the construction of energy storages with a predetermined coil progression can be provided in that at least a first area with coils having a larger spacing and at least a second area with coils having a smaller spacing are provided, for example, in an energy storage. The stiffness of the energy storage is smaller in the first area than in the second area.

The torsional vibration damper according to the invention is particularly suited for use in a hydrodynamic coupling arrangement. A coupling arrangement of this type preferably has a hydrodynamic circuit formed at least by an impeller and a turbine, and a clutch device for bypassing the hydrodynamic circuit in predetermined operating states. While the mass arrangement of the torsional vibration damper is formed by the turbine, a holder of the mass arrangement for connecting the mass arrangement to the torsion damper hub is in the form of the turbine base of the turbine.

BRIEF DESCRIPTION OF THE DRAWINGS

The invention will be further described in detail with reference to the drawings in which.

DETAILED DESCRIPTION OF THE PRESENTLY PREFERRED EMBODIMENTS

Figure 1:
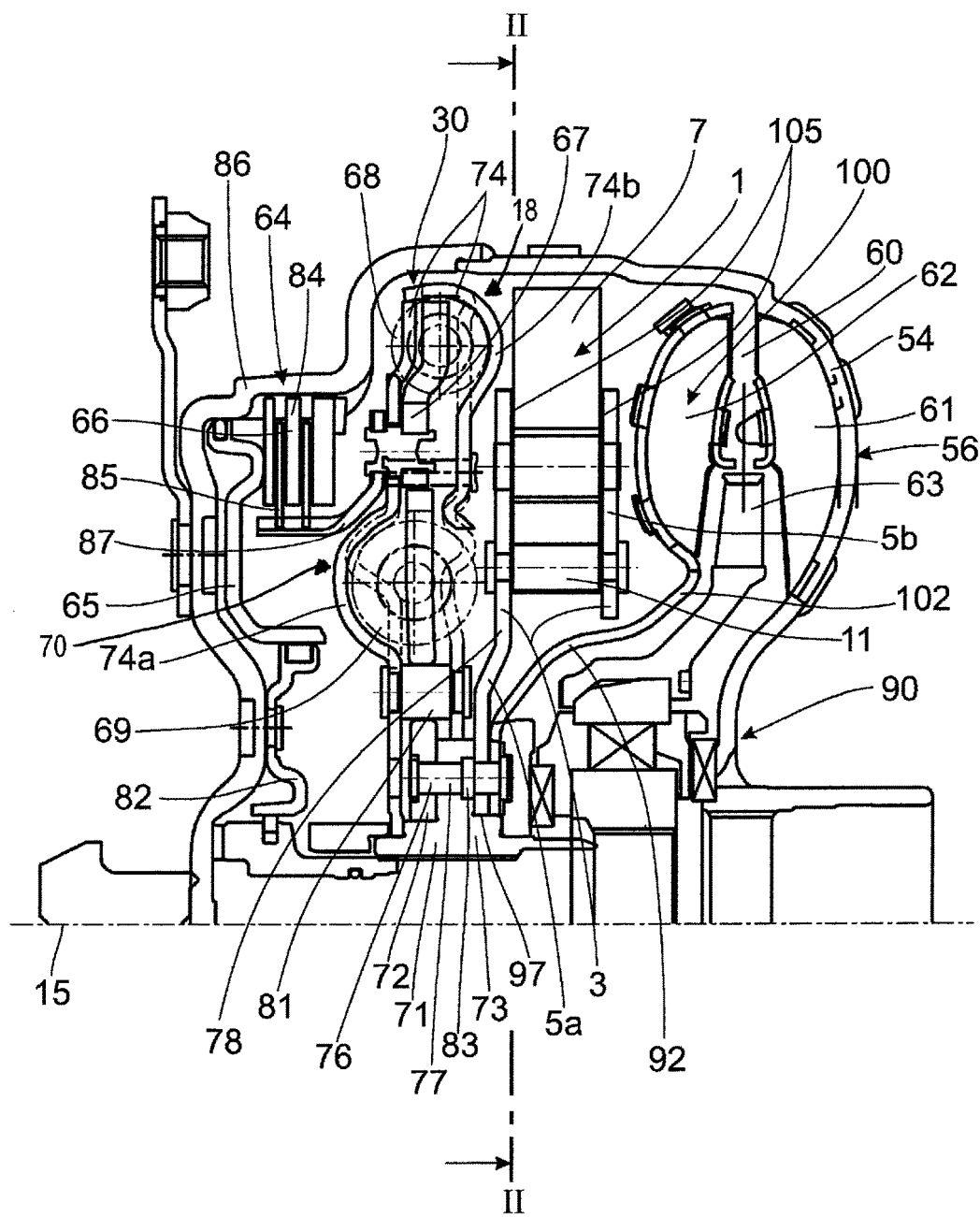
FIG. 1 is a sectional view through a torsional vibration damper in a coupling arrangement with a damping device whose input is connected to a clutch device and whose output is connected to a mass damper system and a mass arrangement.

FIG. 1 shows a coupling arrangement 56 which has a housing 54 and, since it is constructed as a hydrodynamic torque converter 90, a hydrodynamic circuit 60 with impeller 61, turbine 62 and stator 63. Further, a clutch device 64 is provided which is formed with a clutch piston 65 and with a friction disk clutch 66, wherein radially outer friction disk elements 84 of the friction disk clutch 66 are in toothed engagement with an outer wall 86 of the housing 54 and radially inner friction disk elements 85 of the friction disk clutch 66 are in toothed engagement with a friction disk element carrier 87 which engages at an input 67 of a damping device 70. Depending on the control of the clutch piston 65 which is arranged on a piston carrier 82 so as to be axially displaceable, the clutch device 64 is movable between an engagement position and a release position. The input 67 of the damping device 70 is connected via a first damping unit 68 to an intermediate transmission 74 which has two intermediate transmission elements 74a and 74b arranged so as to be spaced apart axially and held at a fixed axial distance by spacer elements 81. The intermediate transmission 74 is connected via a second damping unit 69 to an output 72 which cooperates with a torsion damper hub 71 acting as driven side 73. The damping device 70 serves together with a mass damper system 1 and a mass arrangement 100 as torsional vibration damper 30, the mass arrangement 100 being formed in the present case by the turbine 62.

As is further shown in FIG. 1, the mass damper system 1 has a damper mass carrier 3 with two damper mass carrier elements 5a and 5b arranged so as to be spaced apart axially, damper masses 7 being received therebetween. Spacer pieces 11 which serve in each instance to receive an annular component part 32 (FIGS. 2, 3) as will be described in detail in the following are provided axially between the two damper mass carrier elements 5a and 5b. In contrast to damper mass carrier element 5b, damper mass carrier element 5a has a radially inwardly extending radial lengthening 78 in order to be connected to the output 72 of the torsional vibration damper 30 and, therefore, to the torsion damper hub 71 forming the driven side 73 by a connection arrangement 77 formed as riveted joint. The mass arrangement 100 also has a radially inwardly extending holder 102 which is formed by the turbine base 92 and which is connected by the connection arrangement 77 to the output 72 of the torsional vibration damper 30 and, therefore, to the torsion damper hub 71 forming the driven side 73. In order that the radial lengthening 78 of the mass damper system 1 and the holder 102 of the mass arrangement 100 can be connected to the output 72 as well as to the torsion damper hub 71, the connection arrangement 77 has axially multi-stepped rivets 76. Not only do these axially multi-stepped rivets 76 connect all of the above-mentioned component parts to one another axially, but beyond this they also form intermediate riveted joints 83 such that, for example, the radial lengthening 78 of the mass damper system 1 and the holder 102 of the mass arrangement 100 are first connected to the output 72 and to the torsion damper hub 71 when the connection of the two latter component parts, i.e., output 72 and torsion damper hub 71, has already been produced. Accordingly, a staggered production is possible, which has advantages in the manufacturing process.

The mass damper system 1 is supported at a radial support 97 provided at the radial outer side of the torsion damper hub 71 via the radial lengthening 78, and the mass arrangement 100 is supported at radial support 97 via the holder 102.

Figure 4:
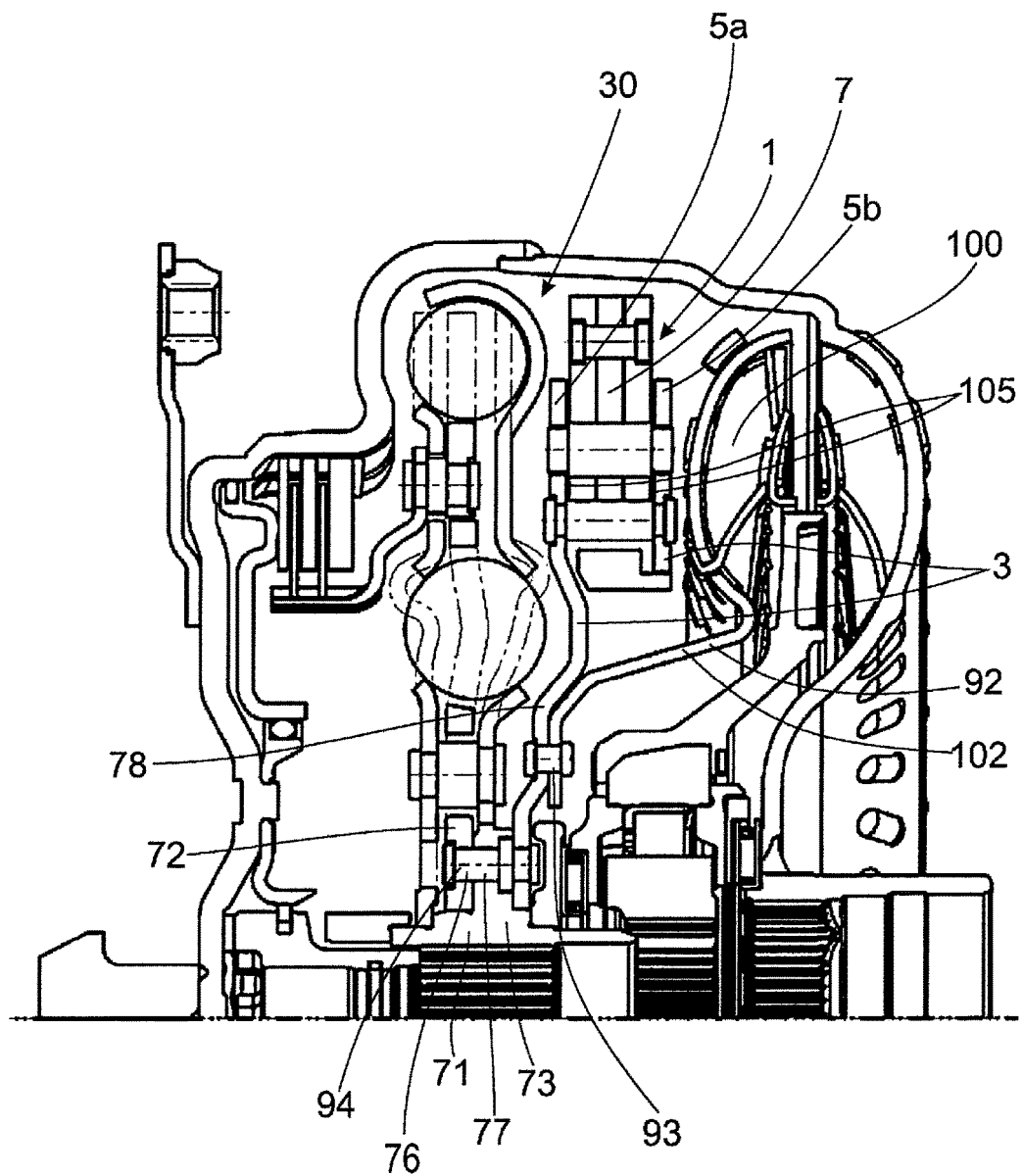
FIG. 4 is the same as FIG. 1, but with the mass arrangement connected to the output via the mass damper system.

In contrast, FIG. 4 shows a torsional vibration damper 30 in which the mass arrangement 100 also has a radially inwardly extending holder 102 formed by the turbine base 92, but this mass arrangement 100 is not connected directly the output 72 of the torsional vibration damper 30 and, therefore, to the driven side 73 and is merely indirectly connected via the radially inwardly extending radial lengthening 78 of the damper mass carrier element 5a. To this end, a first connection 93 formed by riveting is provided between the holder 102 of the mass arrangement 100 and the radial lengthening 78 of the damper mass carrier element 5a, and a second connection 94 formed by the connection arrangement 77 is provided between the radial lengthening 78 of the damper mass carrier element 5a and the output 72 of the torsional vibration damper 30. Owing to the radial and/or axial offset of the connections 93, 94, the solution according to FIG. 4 is appreciably more compact axially than the solution according to FIG. 1 in which, however, it is sufficient to form only one individual connection in the form of the connection arrangement 77.

Figure 6:
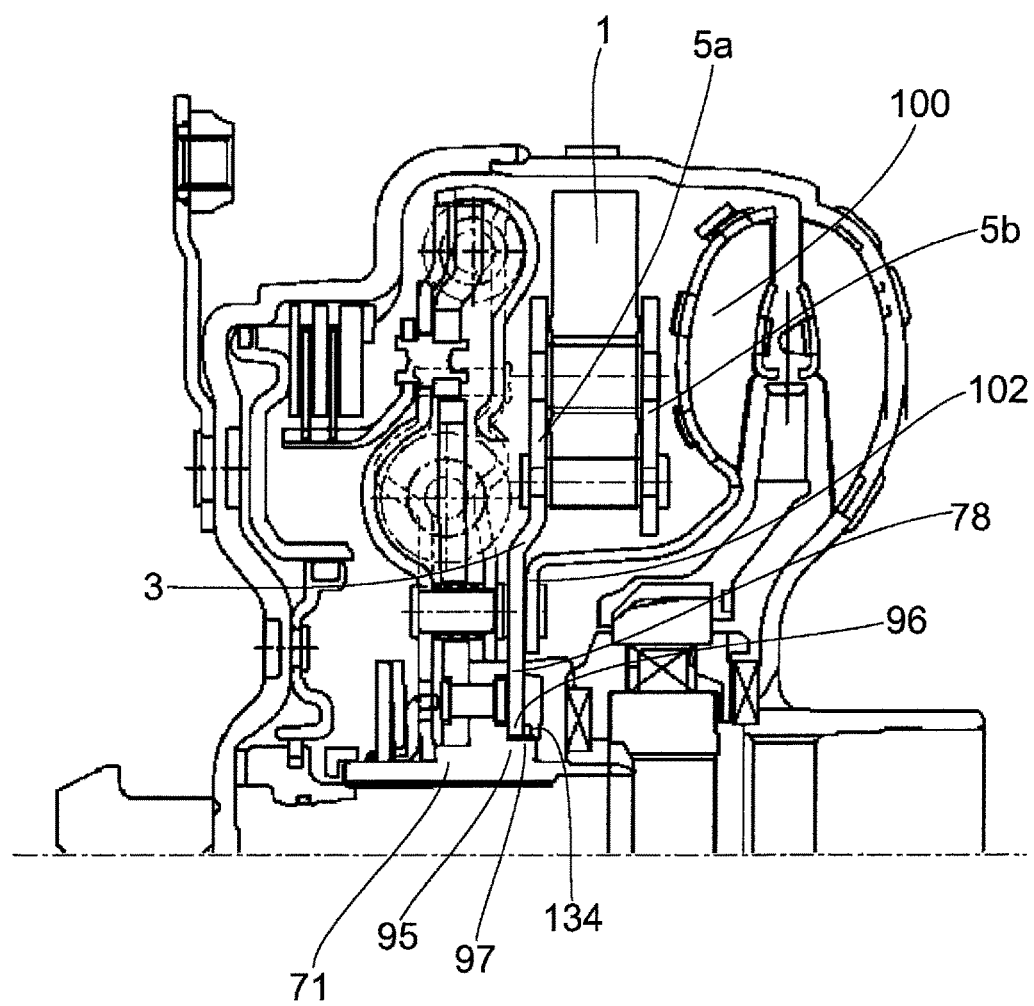
FIG. 6 is the same as FIG. 1, but with the output connected to a mass damper system and a mass arrangement by teeth.

As an alternative to the connection of the radial lengthening 78 of the damper mass carrier element 5a and possibly also of the holder 102 of the mass arrangement 100 to the output 72 of the torsional vibration damper 30 by riveting, it is also conceivable to form this connection by teeth 95, 96 as is shown in FIG. 6, where toothing 95 is formed as outer toothing in the radial support 97 at the radial outer side of the torsion damper hub 71 and toothing 96 is formed as inner toothing at the radial lengthening 78 of the damper mass carrier element 5a and possibly also at the holder 102 of the mass arrangement 100. The two toothings 95, 96 are axially secured relative to one another by interference fit 134.

The damping units 68 and 69 are configured as follows: either both damping units 68 and 69 are configured for full load so that they are prevented from running against a rotational angle stop within the torque range delivered by a drive such as an internal combustion engine, or, if one of the damping units 68, 69 is to be configured for partial load, it is ensured that the other damping unit 68, 69 is configured for full load in every case. In particular, when one of the damping units 68, 69 is configured for partial load this damping unit is permitted to reach the associated rotational angle stop within the torque range delivered by the drive so that as soon as this happens the respective component provided on the driven side of the damping unit 68, 69 is driven along in the same motion with the respective component provided on the drive side 18 of the damping unit. Accordingly, in case of damping unit 68, the intermediate transmission 74 is moved with the input 67; on the other hand, in case of damping unit 69 the output 72 is moved with the intermediate transmission 74. However, due to the configuration of the respective other damping unit 68 or 69 for full load, there will still be damping for the damper masses 7 of the damper mass carrier 3.

The configuration of one of the damping units 68 or 69 for partial load can be advantageous, for example, when a damping unit of low stiffness is required for suppressing certain torsional vibrations.

Figure 5A:
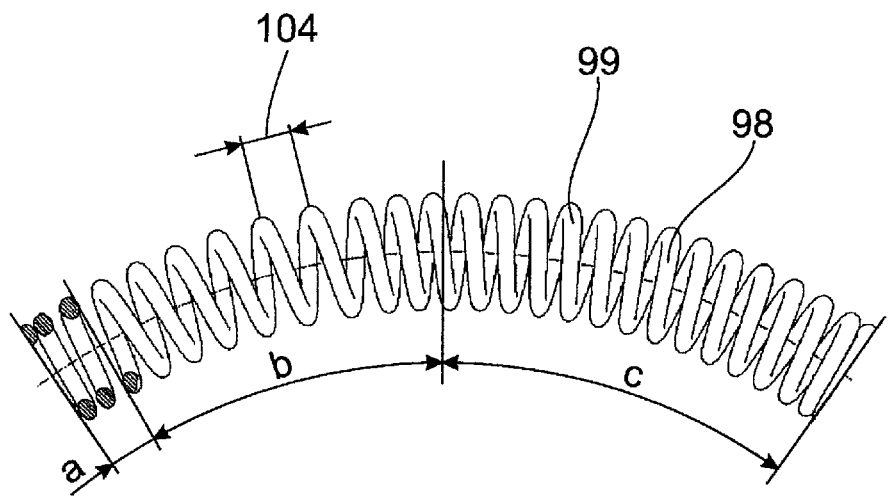
FIG. 5 is a sectional view of an energy storage of the damping device with different coil spacing (FIG. 5a) and with different extension length (FIG. 5b)
Figure 5B:
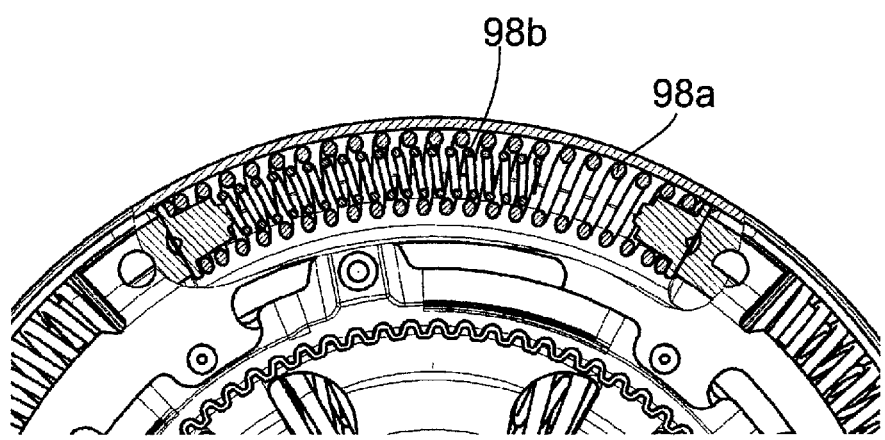

Alternatively, however, other solutions for forming energy storages of damping unit 68 and/or damping unit 69 are also conceivable. Accordingly, FIG. 5a shows the construction of an energy storage 98 in which the individual coils 99—seen in extension direction and with the energy storage relaxed—are provided with varying distances 104 from one another in different extension zones a to c. Accordingly, multi-stepped characteristic lines can be generated with only one energy storage. Serving the same purpose, i.e., to generate multi-stepped characteristic lines, is the construction of energy storages 98a and 98b shown in FIG. 5b which are arranged coaxial to one another in that energy storage 98a encloses energy storage 98b. In this case, the length of the two energy storages 98a, 98b in the extension direction is unequal so that the shorter energy storage 98b first undergoes deformation when the longer energy storage 98a has been compressed by that amount by which it projected beyond energy storage 98b in relaxed state.

Figure 2:
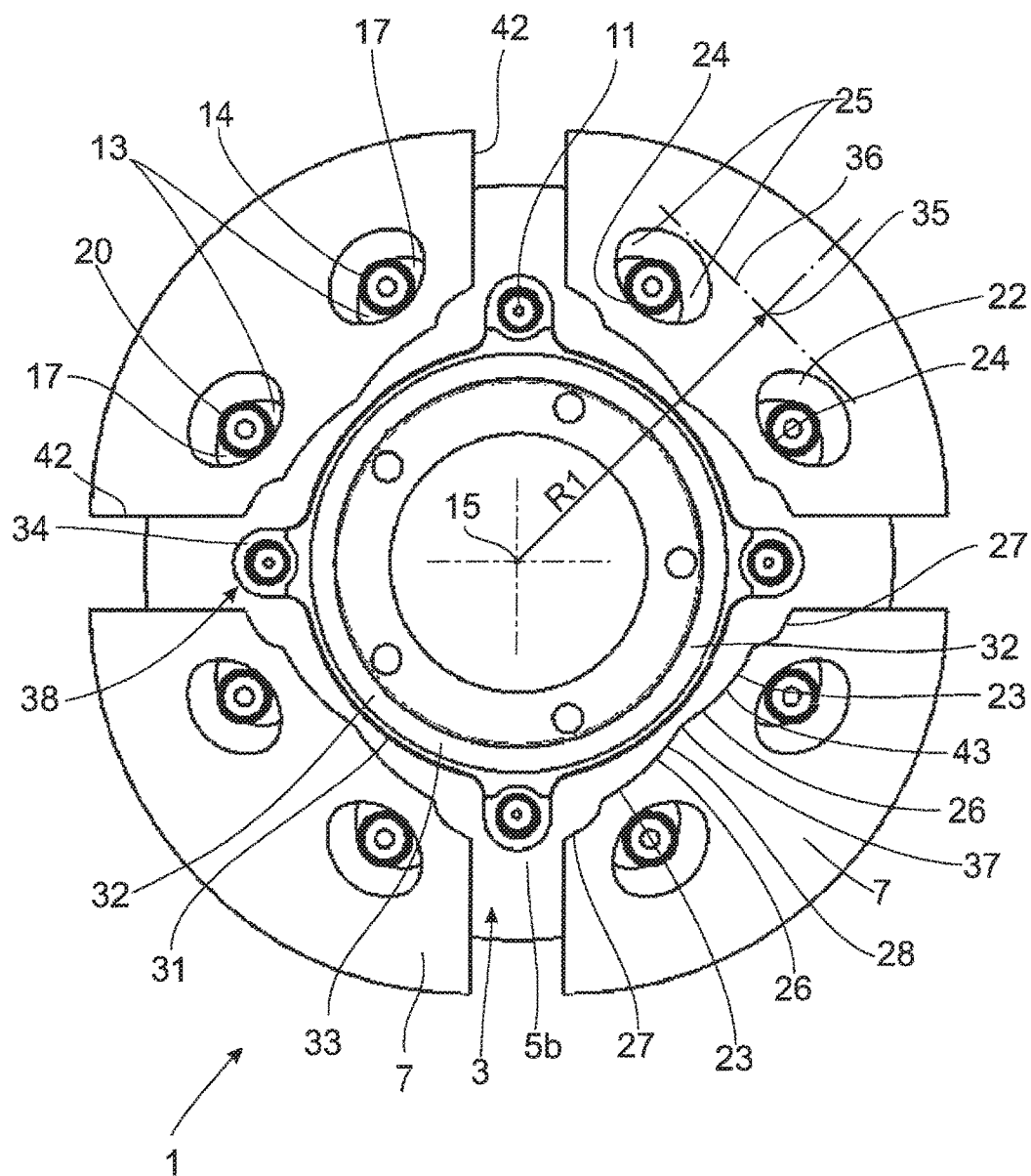
FIG. 2 is a top view of the mass damper system in the direction II-II in FIG. 1 in an operating state.
Figure 3:
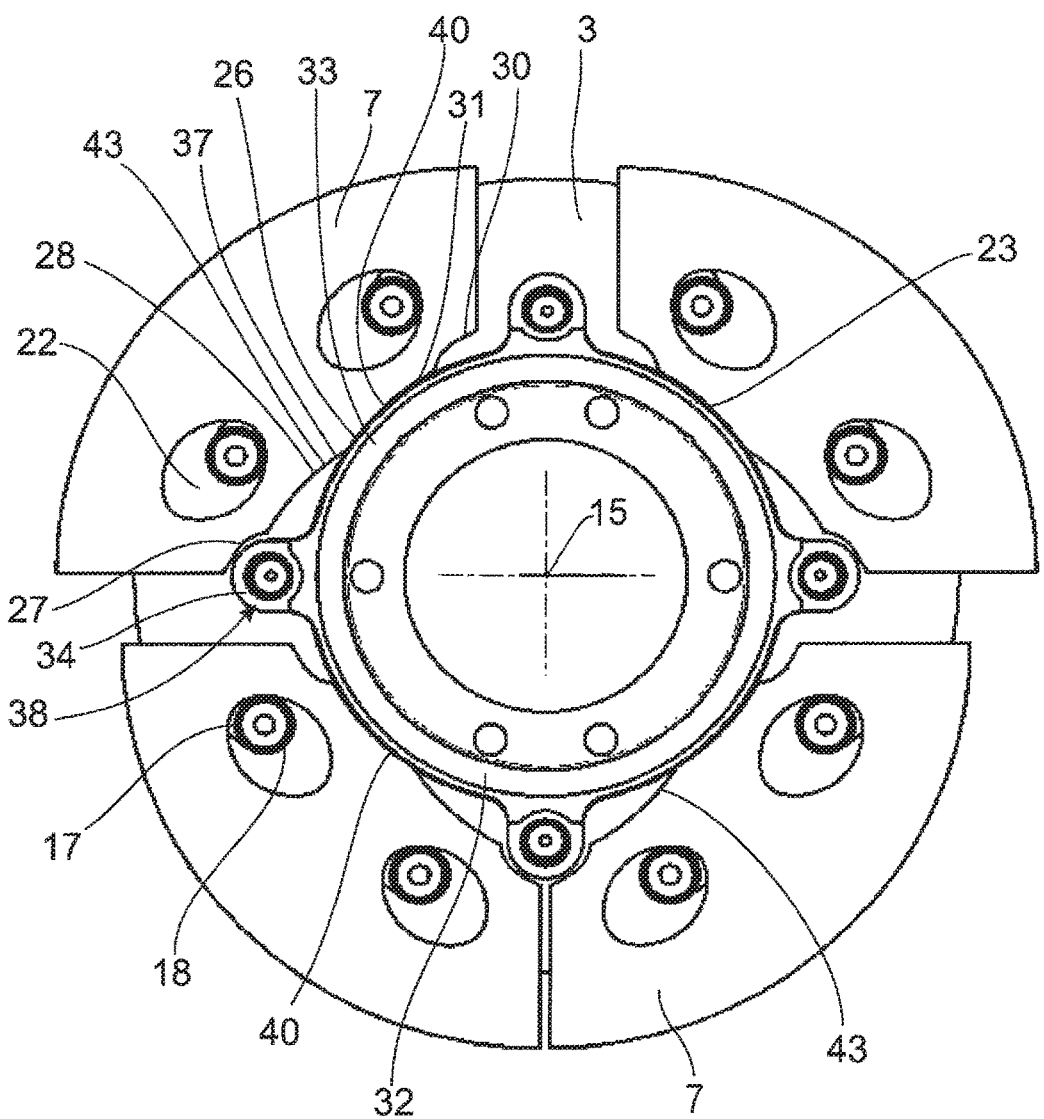
FIG. 3 is the same as FIG. 2, but with the mass damper system in neutral state.

The following pertains to the mass damper system 1: for the sake of better illustrating the damper masses 7 received at the damper mass carrier 3, the damper mass carrier element 5a arranged axially in front of the damper masses 7 in viewing direction is omitted from FIGS. 2 and 3 and only the damper mass carrier element 5b arranged axially behind the damper masses 7 in viewing direction is shown. The damper masses 7 each have guide paths 22 formed in pairs for receiving coupling elements 20 which are formed as rolling elements. The guide paths 22 are configured in such a way that they allow a radial movement of the damper masses 7 relative to the coupling elements 20. The damper masses 7 have stop sides 43 radially inwardly adjoining their circumference sides.

Guide paths 13 having a curved course are provided at the damper mass carrier elements 5a and 5b, also in pairs in each instance. Referring to the view in FIG. 2 or 3, the guide paths 13 each have an initial region 14 in which the respective guide path 13 has the greatest radial distance from a central axis 15 and connection regions 17 which extend circumferentially opposite one another so as to adjoin both sides of the initial region 14. The guide paths 22 provided at the damper masses 7 also have a curved course, each with an initial region 24 in which the respective guide path 13 has the smallest radial distance from the central axis 15 and with connection regions 25 which extend circumferentially opposite one another so as to adjoin both sides of the initial region 14. The guide paths 22 are provided in each instance at both sides of a damper mass center 35 of the respective damper mass. This damper mass center 35 is located in a central extension radius 36 of the damper masses 7 disposed at a distance R1 from the center axis 15 during driving operation. The state of the damper masses 7 during driving operation is shown in FIG. 2 and exists when the mass damper system 1 is operated at a speed at which the centrifugal force exceeds the weight force.

The coupling elements 20 received in the guide paths 13 and 22 extend in each instance on both sides of the respective guide path 22 into the guide paths 13 provided there. In the view according to FIG. 2, the damper masses 7 tend radially outward owing to the centrifugal force so that the coupling elements 20 position themselves in the initial region 24 of the respective guide path 22 in each instance, i.e., in that region having the smallest radial distance from the center axis 15. The coupling elements 20 are supported in the initial region 14 of the damper mass carrier elements 5a and 5b, i.e., in that region having the greatest radial distance from the central axis 15.

The damper masses 7 have in each instance at their radially inner ends a geometric formation 28 having a first contact area 26 in the circumferentially central portion, but second contact areas 27 in the circumferentially outer portions. The first contact area 26 has an area center 37 which divides the first contact area 26 into formation halves 23. This geometric formation 28 cooperates in a manner to be described in the following with stops 31 which are provided radially inside of the damper masses 7 and which are gathered at an annular component part 32.

In circumferential direction between every two damper masses 7, the annular component part 32 has a holder 34 which surrounds a spacer piece 11 so that the holder 34 serves in each instance as a stop receiver 38. Accordingly, the annular component part 32 is received at the damper mass carrier 3 so as to be fixed with respect to rotation relative to it. An annular body 33 extending in circumferential direction acts between every two stop receivers 38 with a stop profile 40. The stop receivers 38 and stop profiles 40 form common stops 31 at the annular component part 32.

When the mass damper system 1 is operated at a speed at which the centrifugal force exceeds the weight force, the damper masses 7 tend radially outward under the influence of centrifugal force so that the coupling elements 20 can be positioned in each instance in the initial region 24 of the respective guide path 22 of the damper masses 7. While torsional vibrations can force deflections of the damper masses 7 in circumferential direction so that the coupling elements 20 are deflected from the initial regions 14, 24 of the guide paths 13, 22 into their connection regions 17, 25, the coupling elements 20 are always restored to the initial position under the influence of centrifugal force as the torsional vibration decays.

On the other hand, when the centrifugal force drops below the weight force, for example, in creep mode of a motor vehicle or when stopping a drive, e.g., an internal combustion engine, the damper masses 7 drop radially inward to occupy the relative position, shown in FIG. 3, with respect to one another and with respect to the damper mass carrier 3. In an operating state of this kind, the two damper masses 7 located radially above the central axis 15 drop radially inward until their stop sides 43 with the relevant formation half 23 of the first contact area 26 for the movement direction come in contact with the associated stop profile 40 of the stop 31 at the annular body 33 of the annular component part 32. If the guide paths 13, 22 should permit a further movement of the damper masses 7 radially downward, this movement will only end when the relevant second circumferential region 27 of the respective damper mass 7 for the movement direction arrives at the holder 34 and, therefore, at the stop receiver 38 of the annular component part 32. The two damper masses 7 located radially below the central axis 15 likewise drop radially inward until their stop sides 43 with the first contact areas 26 which are formed thereon and which are relevant for the movement direction have come in contact with the associated stop profile 40 of stop 31 at annular body 33 of the annular component part 32 and until, in addition, the second contact areas 27 of the respective damper masses 7 which are relevant for the movement direction have come in contact with the corresponding holders 34 and, therefore, with the stop receivers 38 of the annular component part 32. In this way, the two damper masses 7 located radially below the central axis 15 are prevented from coming in contact with one another by their circumference sides 42.

Since the torsional vibration damper 30 is formed with a damping device 70 whose output 72 is connected to a mass damper system 1 as well as to a mass arrangement 100, there is the problem that at certain speeds, for example, within a speed range of between 1,500 and 1,800 revolutions per minute, the deflection angle at the output 72 of the damping device 70 drops sharply even when torsional vibrations are present at the input 67 of the damping device 70. Accordingly, since the output 72 of the damping device 70 stays at least approximately in a vibration node, the vibration excitations which are urgently required for the functioning of damper masses 7 of the mass damper system 1 are very slight. Therefore, it cannot be ruled out that the friction effect existing between the damper mass carrier elements 5a, 5b and the damper masses 7 is sufficient to prevent a deflection of the damper masses 7 relative to the damper mass carrier elements 5a, 5b and, therefore, relative to the damper mass carrier 3. In order to mitigate this problem, it is provided that a contact device 105 is associated with the damper mass carrier elements 5a, 5b and, accordingly, with the damper mass carrier 3 and the at least one damper mass 7, which contact device 105 reduces the hindrances to the deflection of the at least one damper mass relative to the damper mass carrier.

In order to fulfill its purpose, the contact device 105 (see FIG. 1 or 4) is provided at one of the two subassemblies— i.e., damper mass carrier elements 5a, 5b and damper mass 7—and acts on the respective other subassembly. In a particularly simple configuration, the contact device 105 is achieved through a surface treatment which is preferably carried out by coating the component parts 5a, 5b or 7 of one of the subassemblies or by applying a film to component parts 5a, 5b or 7 of one of the two subassemblies, which serves to reduce the dynamic and static friction values between these subassemblies and, therefore, the friction acting upon the latter. The coatings are not limited to friction-reducing plastics such as PTFE (polytetrafluorethylene) or anti-friction paint; on the contrary, constituents such as graphite, sintered metal or molybdenum can also be used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torsional vibration damper comprising
a damping device (70) having an input (67) and an output (72) operatively connected to a driven side (73);
a connection arrangement (77);
two subassemblies comprising a mass damper system (1) and a mass arrangement (100);
said output (72) of the damping device being connected to said mass damper system (1) and to said mass arrangement (100); wherein one of said two subassemblies comprising said mass damper system (1) and said mass arrangement (100) which are connected to said output (72) of said damping device (70) engages at said respective other subassembly comprising said mass damper system (1) and said mass arrangement (100) and wherein said other subassembly is connected to said output (72) by said connection arrangement (77); and
wherein said mass damper system (1) comprises a damper mass carrier (3) and at least one damper mass (7) at said damper mass carrier (3) and said mass arrangement (100) having at least one holder (102); wherein said mass arrangement (100) has a first connection (93) to said damper mass carrier (3) of said mass damper system (1) by said holder (102), and wherein said damper mass carrier (3) has a second connection (94) to said output (72) by said connection arrangement (77).

2. The torsional vibration damper according to claim 1, additionally comprising a torsion damper hub (71) comprising a radial support (97) for said damper mass carrier (3) of said mass damper system (1); and wherein said output (72) is connected to said torsion damper hub (71) serving as the driven side (73).

3. The torsional vibration damper according to claim 2, wherein said damper mass carrier (3) comprises at least one damper mass carrier element (5a); said radial support (97) at said torsion damper hub (71) has a first toothing (95), and said at least one damper mass carrier element (5a) has a second toothing (96) in operative connection with said first toothing (95), and wherein said first and second toothings (95, 96) are held in an axially predetermined position relative to one another by an interference fit (134) to form said connection arrangement (77).

4. The torsional vibration damper according to claim 1, additionally comprising a torsion damper hub (71) which serves as driven side (73) and wherein said mass damper system (1) comprising the damper mass carrier (3) and at least one damper mass (7) at said damper mass carrier (3) and said mass arrangement (100) having at least one holder (102); wherein said output (72) is connected to said torsion damper hub (71), said torsion damper hub (71) having a radial support (97) for said damper mass carrier (3) of said mass damper system (1) and for said holder (102) of said mass arrangement (100).

5. The torsional vibration damper according to claim 4, additionally comprising the torsion damper hub (71) and the damper mass carrier (3) having at least one damper mass carrier element (5a, 5b), and wherein said connection arrangement (77) comprises a plurality of axially multi-stepped rivets (76) extending through said torsion damper hub (71) and through said damper mass carrier element (5a).

6. The torsional vibration damper according to claim 4, additionally comprising a hydrodynamic coupling arrangement (56) having a hydrodynamic circuit (60) formed at least by an impeller (61) and a turbine (62) and having a clutch device (64) for bypassing the hydrodynamic circuit (60) in predetermined operating states; wherein said mass arrangement (100) is formed by said turbine (62); and said holder (102) of said mass arrangement (100) is formed by a turbine base (92) of said turbine (62).

7. The torsional vibration damper according to claim 1, additionally comprising a torsion damper hub (71) which serves as driven side (73) and the damper mass carrier (3) having at least one damper mass carrier element (5a, 5b), and wherein said connection arrangement (77) comprises a plurality of axially multi-stepped rivets (76) extending through said torsion damper hub (71) and through said damper mass carrier element (5a).

8. The torsional vibration damper according to claim 1, wherein said damping device (70) comprises an individual damping unit or a plurality of damping units (68, 69) of which said respective damping unit (68) on a drive side (18) is in operative connection with the respective damping unit (69) on the driven side (73) via an intermediate transmission (74), and wherein said individual damping unit or said at least one damping unit (68, 69) of said damping device (70) comprise a selection of a predetermined combination of energy storages (98), a configuration of energy storages (98) for a predetermined load, or a construction of energy storages (98) with a predetermined coil progression.

9. The torsional vibration damper according to claim 8, wherein said at least one damping unit (68, 69) of said damping device (70) comprises a plurality of energy storages (98a, 98b) which differ from one another with respect to their stiffness or with respect to their extension in an operative direction in order to generate a multi-step characteristic.

10. The torsional vibration damper according to claim 9, wherein said energy storages (98a, 98b) constructed with relatively greater and relatively smaller extension in an operative direction are arranged concentric to one another; and wherein the energy storage (98a) with the relatively greater extension in extension direction surrounds the energy storage (98b) with the relatively smaller extension in extension direction.

11. The torsional vibration damper according to claim 8, wherein said at least one of said damping units (68, 69) of said damping device (70) comprises energy storages (98) which are configured for partial load with respect to an available torque.

12. The torsional vibration damper according to claim 8, wherein said at least one of said damping units (68, 69) of said damping device (70) comprises energy storages (98) having coils (99) which have in an extension direction at least a portion in which distances of said coils (99) relative to one another diverge from those distances between the coils (99) that are provided at other portions of said energy storages (98).

13. The torsional vibration damper according to claim 1, additionally comprising a hydrodynamic coupling arrangement (56) having a hydrodynamic circuit (60) formed at least by an impeller (61) and a turbine (62) and having a clutch device (64) for bypassing the hydrodynamic circuit (60) in predetermined operating states; wherein said mass arrangement (100) is formed by said turbine (62); and said holder (102) of said mass arrangement (100) is formed by a turbine base (92) of said turbine (62).

14. The torsional vibration damper according to claim 1, additionally comprising a radial support (97) at said torsion damper hub (71); wherein said damper mass carrier (3) comprises at least one damper mass carrier element (5a); said radial support (97) has a first toothing (95), and said at least one damper mass carrier element (5a) has a second toothing (96) in operative connection with said first toothing (95), and wherein said first and second toothings (95, 96) are held in an axially predetermined position relative to one another by an interference fit (134) to form said connection arrangement (77).

15. The torsional vibration damper according to claim 1, wherein said damping device (70) comprises an individual damping unit or a plurality of damping units (68, 69) of which said respective damping unit (68) on a drive side (18) is in operative connection with the respective damping unit (69) on the driven side (73) via an intermediate transmission (74), and wherein said individual damping unit or said at least one damping unit (68, 69) of said damping device (70) comprise a selection of a predetermined combination of energy storages (98), a configuration of energy storages (98) for a predetermined load, or a construction of energy storages (98) with a predetermined coil progression.

* * * * *